US009470103B2

(12) United States Patent
Pirker

(10) Patent No.: US 9,470,103 B2
(45) Date of Patent: Oct. 18, 2016

(54) TURBOMACHINE

(71) Applicant: MTU Aero Engines AG, Munich (DE)

(72) Inventor: Klaus Pirker, St. Lambert (CA)

(73) Assignee: MTU AERO ENGINES AG, Munich (DE)

( * ) Notice: Subject to any disclaimer, the term of this patent is extended or adjusted under 35 U.S.C. 154(b) by 462 days.

(21) Appl. No.: 14/096,455

(22) Filed: Dec. 4, 2013

(65) Prior Publication Data

US 2014/0161607 A1   Jun. 12, 2014

(30) Foreign Application Priority Data

Dec. 11, 2012  (EP) .................................... 12196461

(51) Int. Cl.
| F01D 11/00 | (2006.01) |
| F01D 9/06 | (2006.01) |
| F01D 25/16 | (2006.01) |

(52) U.S. Cl.
CPC ............. *F01D 11/005* (2013.01); *F01D 9/065* (2013.01); *F01D 25/162* (2013.01); *F05D 2240/55* (2013.01); *F05D 2250/36* (2013.01); *Y02T 50/671* (2013.01)

(58) Field of Classification Search
CPC ........ F01D 11/005; F01D 9/06; F01D 25/24; F05D 2240/55; F05D 2250/61; F05D 2250/611
See application file for complete search history.

(56) References Cited

U.S. PATENT DOCUMENTS

| 3,690,785 A * | 9/1972 | Lind | F01D 11/005 |
| | | | 277/364 |
| 4,184,689 A * | 1/1980 | Brodell | F01D 11/005 |
| | | | 277/637 |
| 4,274,805 A * | 6/1981 | Holmes | F01D 25/246 |
| | | | 415/138 |
| 4,358,120 A * | 11/1982 | Moore | F16J 15/3288 |
| | | | 277/355 |
| 4,730,832 A * | 3/1988 | Cederwall | B23P 19/04 |
| | | | 277/321 |
| 5,256,035 A | 10/1993 | Norris et al. | |
| 7,140,840 B2 * | 11/2006 | Taillant | F16J 15/0887 |
| | | | 277/654 |
| 2010/0111682 A1* | 5/2010 | Scoggins | F01D 9/041 |
| | | | 415/191 |
| 2013/0323045 A1* | 12/2013 | Porter | F16J 15/0887 |
| | | | 415/229 |

FOREIGN PATENT DOCUMENTS

| EP | 1566581 A1 | 8/2005 |
| EP | 2123951 A1 | 11/2009 |
| EP | 2192276 A2 | 2/2010 |

* cited by examiner

*Primary Examiner* — Ninh H Nguyen
(74) *Attorney, Agent, or Firm* — Barlow, Josephs & Holmes, Ltd.

(57) ABSTRACT

The turbomachine includes a mid turbine vane frame, with an annular compartment formed between the mid turbine vane frame and a low-pressure turbine casing being sealed by means of at least two ring seals, wherein one ring seal is in contact with the mid turbine vane frame and the other ring seal is in contact with the low-pressure turbine casing and a radial annular overlap is thereby created with the first-mentioned ring seal.

8 Claims, 1 Drawing Sheet

View A

TURBOMACHINE

BACKGROUND OF THE INVENTION

The present invention relates to a turbomachine.

A turbomachine, such as, for example, an aircraft engine or a stationary gas turbine, generally has a mid turbine frame or mid turbine vane frame 1 to direct a flow of hot gas from a high-pressure turbine to a low-pressure turbine. As shown in EP 2 192 276 A2, for example, the mid turbine vane frame, using a portion of a low-pressure turbine casing, delimits an annular compartment that is connected to a cooling air system. In order to prevent a flow of cooling air from flowing out of the annular compartment into the path of hot gas, the annular compartment is sealed off from the path of hot gas. For example, the sealing is produced by means of a ring seal, which is inserted into a circumferential groove of the mid turbine vane frame formed by two radial webs.

The problem of the invention is to create a turbomachine having an alternative sealing of an annular compartment formed by a mid turbine vane frame and a portion of a low-pressure turbine casing.

SUMMARY OF THE INVENTION

This problem is solved by a turbomachine in accordance with the present invention.

A turbomachine according to the invention, having a mid turbine vane frame for directing a flow of hot gas from a high-pressure turbine to a low-pressure turbine and using a portion of a low-pressure turbine casing to delimit an annular compartment, has, in accordance with the invention, a radially inner ring seal, which is inserted into a circumferential groove for preventing cooling air from being drawn from the annular compartment into the path of hot gas and which is in contact with the mid turbine vane frame, and a radially outer ring seal, which is inserted into the circumferential groove and is in contact with the portion of a low-pressure turbine casing and forms an annular overlap with the radially inner ring seal.

Such a ring seal effectively prevents cooling air from being drawn out of the annular compartment into the path of hot gas. The seal has a radially inner sealing region, a radially middle sealing region, and a radially outer sealing region, with the inner sealing region and the outer sealing region each being formed by one of the ring seals and the radially middle ring region of the two ring seals. As a result, the ring seals each have only one sealing surface on the circumferential side, which substantially simplifies the geometric placement of the ring seals in comparison to conventional ring seals having two sealing surfaces on the circumferential side opposite each other. In addition, the annular overlap enables the ring seals to be shifted in the radial direction of the turbomachine in relation to each other, so that, when there are different thermal expansions of the mid turbine vane frame and the portion of the low-pressure casing, a reliable sealing is achieved. Furthermore, assembly is simplified, because, by means of this ability of the ring seals to shift radially in relation to each other, it is possible to compensate for assembly tolerances.

Preferably, the circumferential groove is formed by two groove walls extending radially outward from the mid turbine vane frame. As a result, the mid turbine vane frame can be constructed with thin walls in the region of the circumferential groove, because the groove walls act to stabilize the mid turbine vane frame.

In order to reduce thermal stresses on the mid turbine vane frame in the region of the circumferential groove, it is advantageous when at least the groove wall in proximity to the path of hot gas in the circumferential direction has a plurality of distributed radial recesses opening in the axial direction of the turbomachine. It is even more advantageous when the groove wall remote from the path of hot gas is provided with recesses so that thermal stresses are also reduced in the region of the groove wall remote from the path of hot gas. In addition, the weight of the mid turbine vane frame is reduced by the recesses.

In an exemplary embodiment, the recesses in the groove wall in proximity to the path of hot gas each have a bottom that is arranged radially inward in relation to the groove base of the circumferential groove. As a result, the thermal stresses can be reduced further, because the mid turbine vane frame is designed with very thin walls in the region of the groove wall in proximity to the path of hot gas.

Preferably, the groove wall remote from the path of hot gas is provided with axially opening radial recesses, the bottoms of which are positioned radially outward in relation to the groove base. As a result, the groove walls remote from the path of hot gas also act in the region of the recesses in proximity to the groove base as barriers to the flow of cooling air, so that the flow of cooling air is diverted in front of the groove base and is not carried unimpeded onto the radially inner sealing region, thereby relieving the latter.

In order to prevent any mechanical stresses from being introduced by the recesses into the groove walls, it is advantageous when the groove walls are designed to be corrugated in the circumferential direction.

In order to fix the ring seals in place axially, they can be pressed against the groove wall in proximity to the path of hot gas by means of a spring element. As a result, a high degree of sealing is already achieved with a small pressure gradient.

Preferably, the radially inner ring seal is arranged downstream of the radially outer ring seal. As a result, the radially inner ring seal is arranged securely in the circumferential groove or, in operation, is clamped between the radially outer ring seal and the groove wall in proximity to the path of hot gas. Alternatively, the radially outer ring seal can be arranged upstream of the radially inner ring seal.

Other advantageous exemplary embodiments are the subject of the present invention.

BRIEF DESCRIPTION OF THE DRAWINGS

A preferred exemplary embodiment of the invention will be discussed in detail below on the basis of schematic illustrations. Shown are.

DETAILED DESCRIPTION OF THE INVENTION

The terms axial and radial refer below to an axial direction and a radial direction of the turbomachine.

Figure 1:
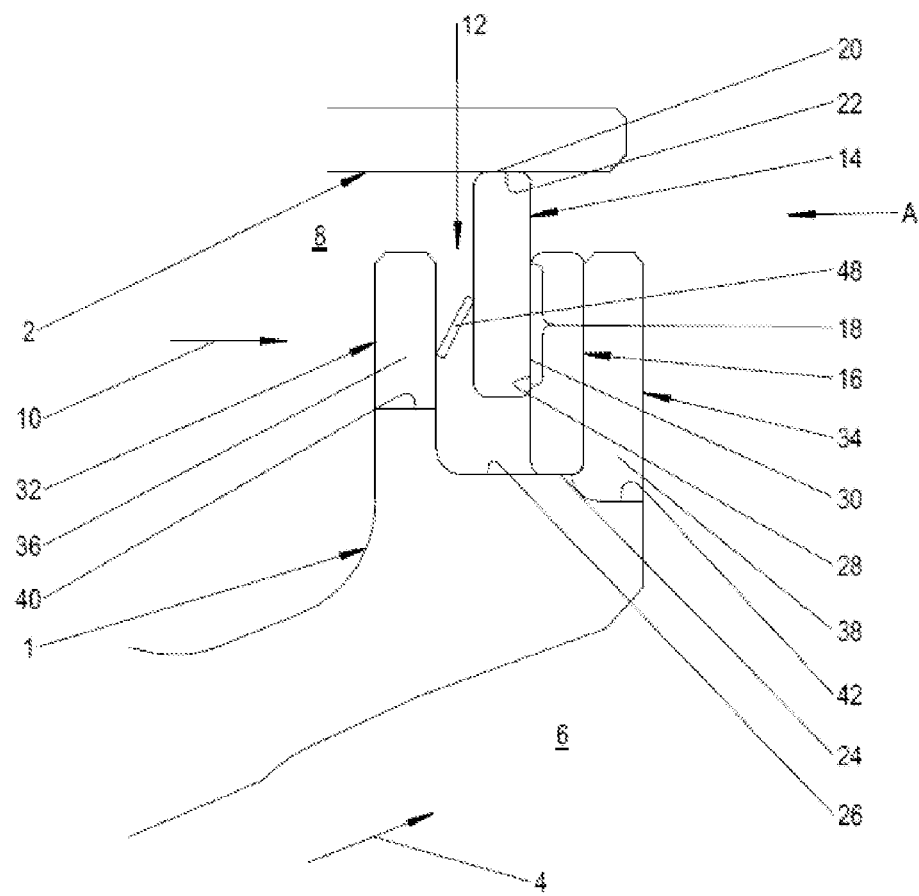
FIG. 1, which is a lengthwise section through a turbomachine according to the invention in the region of the mid turbine vane frame, and FIG. 2, which is a rear view of the turbomachine.

Shown in FIG. 1 is a section of a mid turbine vane frame 1 and a low-pressure turbine casing 2 of a turbomachine, such as an aircraft engine or a stationary gas turbine. The mid turbine vane frame 1 serves to direct a flow of hot gas 4 along a hot-gas path 6 from a high-pressure turbine to a low-pressure turbine and, using a terminal section of the upstream low-pressure turbine casing 2, forms an annular compartment 8. The annular compartment 8 is connected to a cooling air system on the machine side, with a radially outer ring seal 14 and a radially inner ring seal 16, which form a radial annular overlap 18, being arranged in a circumferential groove 12 of the mid turbine vane frame 1 to prevent a flow of cooling air 10 from being drawn into the path of hot gas 6.

The radially outer ring seal 14 serves to form a radially outer sealing portion and, in combination with the radially inner ring seal 16, to form a radially middle sealing region. Thereby prevented are an axial flow of cooling air in the radially outer sealing region and a radial flow of cooling air in the radial middle sealing region out of the annular compartment 8 into the path of hot gas 6. The radially outer ring seal 14 is a radially directed spring lock ring, whose outer circumferential surface 20 rests against an inner circumferential surfaces 22 of the low-pressure turbine casing 2 lying opposite the circumferential groove 12, or its terminal section, to form a seal. In the state in which there is no tension and hence the state in which there is no mounting in the circumferential groove 12, the radially outer ring seal 14 has an outer diameter that is greater than the inner diameter of the low-pressure turbine casing 2 in the region of the inner circumferential surface 22.

The radially inner ring seal 16 serves to form a radially inner sealing portion and, in combination with the radially outer ring seal 14, to form the radially middle sealing region. An axial flow of cooling air out of the annular compartment 8 into the path of hot gas 6 is prevented in the radially inner sealing region as in the radially outer sealing region. The radially inner ring seal 16 is also a radially directed spring lock ring, whose inner circumferential surface 24, however, rests against the groove base 26 of the circumferential groove 12 to form a seal. In the state where there is no tension and hence the state in which there is no mounting in the circumferential groove 12, the radially inner ring seal 16 has an inner diameter that is smaller than the outer diameter of the mid turbine vane frame 1 in the region of the groove base 26.

Viewed in the radial direction, the radially outer ring seal 14 is spaced from the groove base 26 and the radially inner ring seal is spaced from the inner circumferential surface 22 of the low-pressure turbine casing 2.

The annular overlap 18 defines the radial middle sealing region. It is created by a planar rear ring seal surface 28 of the radially outer ring seal 14 and a likewise planar front ring seal surface 30 of the radially inner ring seal 16 that contacts the former so as to form a seal.

The circumferential groove 12 has a groove wall 32 that is removed from the path of hot gas and extends in the radial direction or, as viewed in the axial direction, is in front, and a rear groove wall 34 that is in proximity to the path of hot gas and extends in the radial direction. The groove walls 32, 34 are each provided with a plurality of recesses 36, 38 distributed uniformly over their circumference. In the exemplary embodiment shown, the front recesses 36 and the rear recesses 38 are arranged at the same circumferential positions. However, the recesses 36, 38 can also be positioned displaced relative to one another in the circumferential direction.

The recesses 36, 38 pass through the groove walls 32, 34 in the axial direction and thus open sections of the circumferential groove 12 to the direction of flow of the cooling air 4. The groove walls 32, 34 start at the same radially outer position, but the recesses 36, 38 are designed with different depths. Thus, in the exemplary embodiment shown here, bottoms 40 of the front recesses 36 are arranged radially outward in relation to the groove base 26 and bottoms 42 of the rear recesses 38 are arranged radially inward in relation to the groove base 26. The rear recesses 38 are thus designed to be deeper than the front recesses 36.

Figure 2:
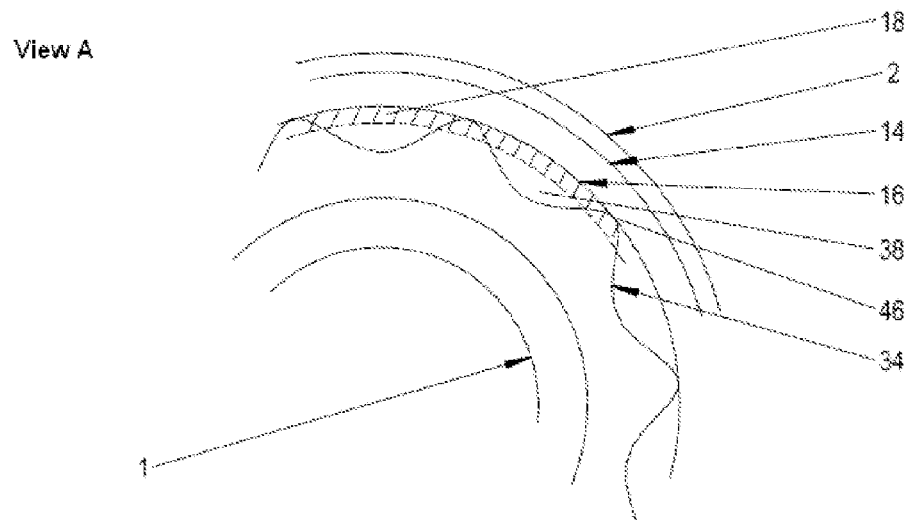

As shown in the case of the rear groove wall 34 in FIG. 2, for example, the groove walls 32, 34 preferably have a corrugated construction. In particular, in the exemplary embodiment shown, the recesses 36, 38 have arch-shaped cavities. Preferably, groove wall sections 44 rising between the recesses 36, 38 have a rounded head region 46. The annular overlap 18, which is not visible in view A, is illustrated cross-hatched.

As shown in FIG. 1, the ring seals 14, 16, which are adjacent to each other, have a smaller axial extension than does the groove base 26. Accordingly, it is fundamentally possible to insert the ring seals 14, 16 so that they can shift in the axial direction in the circumferential groove 12. In the radial direction, the radially outer ring seal 14 is fixed in position on the inner circumferential surface 22 by its pretensioning, which acts radially outward. The radially inner ring seal 16 is fixed in position on the groove base 26 by its pretensioning, which acts radially inward. The radially outer sealing region and the radially inner sealing region are thus formed and closed already when the turbomachine is at standstill. When the turbomachine is in operation, there is a pressure difference between the path of hot gas 6 and the annular compartment 8, with a lower pressure prevailing in the path of hot gas 6 than in the annular compartment 8. Owing to the pressure gradient acting from left to right according to the illustrations in FIG. 1, the ring seals 14, 16 are moved to the right. The radially inner ring seal 16 is thereby clamped between the rear groove wall 34 and the radially outer ring seal 14. The ring overlap 18 is created, as a result of which the annular compartment 8 is closed in the middle sealing region as well. Cooling air is effectively prevented from being drawn out of the annular compartment 8 into the path of hot gas 6. The ring seals 14, 16 are preferably oriented in the circumferential direction in such a way that they lie with their separation slits outside of the recesses 36, 38 and hence in the region of the groove wall sections 44.

In order to achieve a high degree of sealing even for a small pressure gradient, the ring seals 14, 16 can be subjected to a tensioning force by an annular spring element 48 in the direction of the pressure gradient, that is, from left to right in FIG. 1. The spring element 48 rests against the front groove wall 32 and engages with the radially outer ring seal 14, as a result of which the latter is pressed against the radially inner ring seal 16, which, in turn, is pressed against the rear groove wall 34 on account of the tensioning force of the spring element 48. In addition, any unintentional and highly unlikely tilting of the radially outer ring seal 14 to the side on account of the pressure gradient is prevented by the spring element 48, as a result of which the surface contact between its outer circumferential surface 20 and the inner circumferential surface 22 of the low-pressure turbine casing 2 is abolished and instead a linear contact is established.

Preferably, the ring seals 14, 16 have an identical extension in the radial direction and in the axial direction. In particular, the height of the radially inner ring seal 16 is the same as an axial extension of the rear groove wall 34 from the groove base 16 in the direction of the low-pressure turbine casing 6 or the groove wall sections 44.

The turbomachine of the present invention includes a mid turbine vane frame, with an annular compartment formed between the mid turbine vane frame and a low-pressure turbine casing being sealed by means of at least two ring seals, wherein one ring seal is in contact with the mid turbine vane frame and the other ring seal is in contact with the low-pressure turbine casing and a radial annular overlap is thereby created with the first-mentioned ring seal.

It would be appreciated by those skilled in the art that various changes and modifications can be made to the illustrated embodiments without departing from the spirit of the present invention. All such modifications and changes are intended to be covered by the appended claims.

What is claimed is:

1. A turbomachine, comprising:
   a mid turbine vane frame (1) configured to direct a flow of hot gas (4) into a path of hot gas (6) from a high-pressure turbine to a low-pressure turbine, the mid turbine vane frame (1) having a groove walls (32, 34) forming a circumferential groove (12) therein;
   a portion of a low-pressure turbine casing (2) delimiting an annular compartment (8);
   a radially inner seal (16) in contact with the mid turbine vane frame (1); and
   a radially outer ring seal (14) in contact with the portion of the low-pressure turbine casing;
   the radially inner seal (16) contacting the radially outer ring seal (14) forming an annular overlap (18) between the radially inner seal (16) and the radially outer ring seal (14);
   the radially inner seal (16) and radially outer ring seal (14) arranged in the circumferential groove (12) of the mid turbine vane frame (1); the ring seals (14, 16) being pressed against one of the groove walls (34) in proximity to the path of hot gas by a spring element (48); and
   wherein, cooling air is prevented from being drawn out of the annular compartment (8) into the path of hot gas (6).

2. The turbomachine according to claim 1, wherein the circumferential groove (12) is formed by two groove walls (32, 34) extending radially outward from the mid turbine vane frame (1).

3. The turbomachine according to claim 2, wherein the groove walls (32, 34) have a corrugated design in the circumferential direction.

4. The turbomachine according to claim 2, wherein at least the groove wall (34) in proximity to the path of hot gas has a plurality of axially opened radial recesses (38).

5. The turbomachine according to claim 4, wherein bottoms (40) of the recesses (36) in the groove wall (32) in proximity to the path of hot gas are arranged radially outward in relation to the groove base (26).

6. The turbomachine according to claim 4, wherein the recesses (38) in the groove wall (34) in proximity to the path of hot gas each have a bottom (42), which is arranged radially inward in relation to the groove base (26) of the circumferential groove (12).

7. The turbomachine according to claim 1, wherein the radially inner ring seal (16) is arranged behind the radially outer ring seal (14).

8. A turbomachine, comprising:
   a mid turbine vane frame (1) configured to direct a flow of hot gas (4) from a high-pressure turbine to a low-pressure turbine
   a portion of a low-pressure turbine casing (2) delimiting an annular compartment (8);
   a radially inner seal (16);
   a radially outer ring seal (14);
   wherein, in order to prevent cooling air from being drawn out of the annular compartment (8) into a path of hot gas (6), the radially inner ring seal (16), which is contact with the mid turbine vane frame (1) and the radially outer ring seal (14), which is contact with the portion of the low-pressure turbine casing (2) and creates an annular overlap (18) with the radially inner ring seal (16), are arranged in a circumferential groove (12);
   wherein the circumferential groove (12) is formed by two groove walls (32, 34) extending radially outward from the mid turbine vane frame (1);
   wherein at least the groove wall (34) in proximity to the path of hot gas has a plurality of axially opened radial recesses (38) and wherein the recesses (38) in the groove wall (34) in proximity to the path of hot gas each have a bottom (42), which is arranged radially inward in relation to the groove base (26) of the circumferential groove (12).

* * * * *